Figure 1:
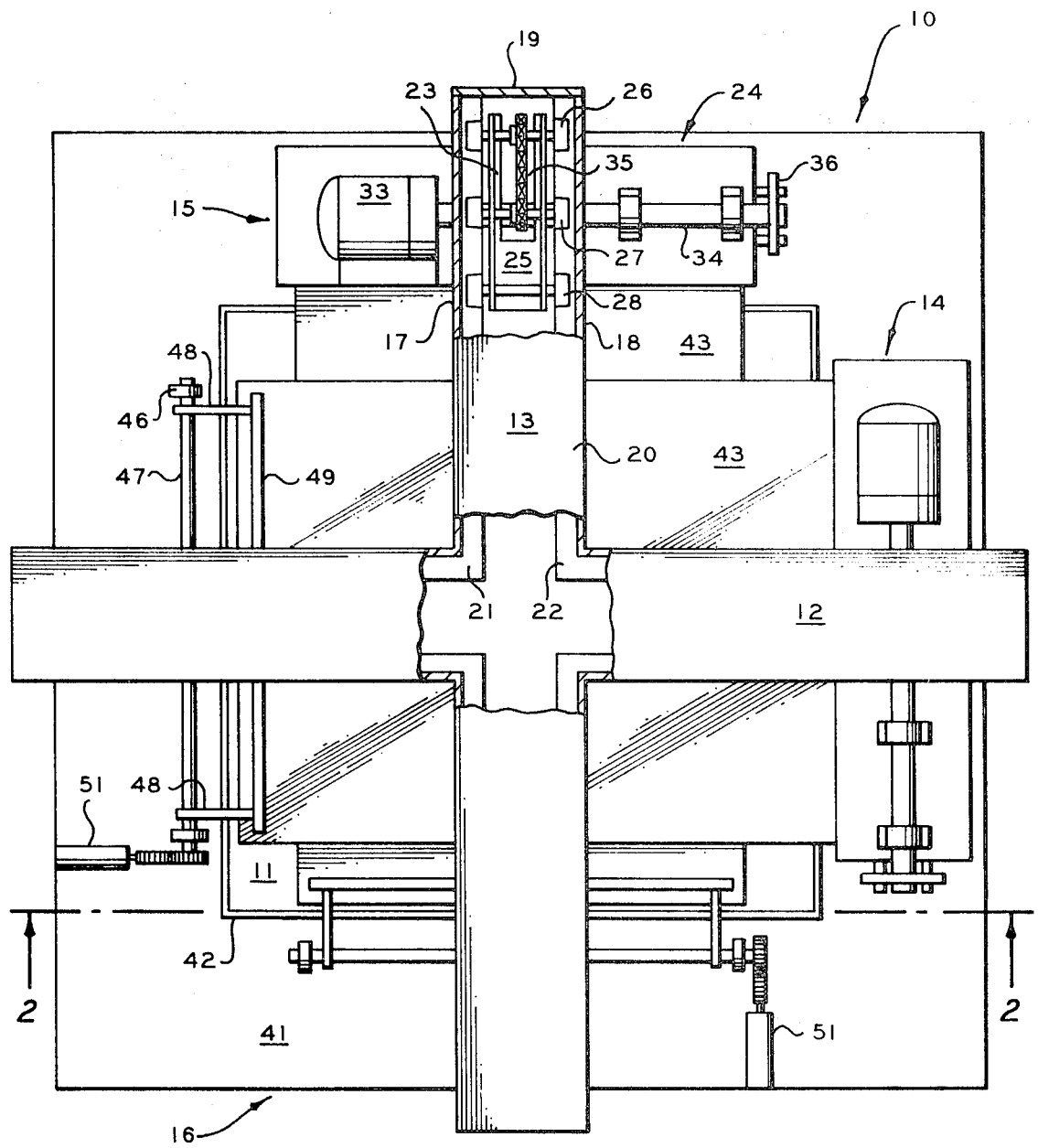

United States Patent

[11] 3,602,494

| [72] | Inventor | Richard R. Holmes |
| | | Etowah, Tenn. |
| [21] | Appl. No. | 821,635 |
| [22] | Filed | May 5, 1969 |
| [45] | Patented | Aug. 31, 1971 |
| [73] | Assignee | Phillips Petroleum Company |

[54] CROSS-LAPPING APPARATUS
4 Claims, 2 Drawing Figs.

[52] U.S. Cl. ................................................ 270/31,
270/32, 270/39, 270/52, 270/79
[51] Int. Cl. .................................................... B65h 29/46
[50] Field of Search ........................................... 270/69, 32,
39, 30, 31, 52, 79

[56] References Cited
UNITED STATES PATENTS

| 641,921 | 1/1900 | Barton | 270/31 |
| 1,822,908 | 9/1931 | Schneider | 270/31 |
| 2,263,555 | 11/1941 | Gilbert et al. | 270/31 |
| 3,083,008 | 3/1963 | Miller | 270/31 |
| 3,449,810 | 6/1969 | Wade | 270/39 X |

Primary Examiner—Robert W. Michell
Assistant Examiner—L. R. Oremland
Attorney—Young and Quigg ABSTRACT: A film cross-lapping machine comprising first and second film-dispensing means movable in intersecting and angularly disposed paths for depositing first and second film materials in interlaced relation on a film-receiving platform.

INVENTOR.
R.R. HOLMES
BY Young and Quigg
ATTORNEYS

CROSS-LAPPING APPARATUS

This invention relates to laminated plastics. In one aspect it relates to a cross-laminating apparatus for arranging layers of plastic sheet material in superimposed relation.

Cross-laminating machines, or cross-lappers as they are commonly called, are widely used in the textile and plastics industries to form multilayered stacks of sheet material. The cross-lapping technique permits the formation of a sheet laminate possessing properties particularly suited for a specific application. It permits the building up of a web having equal strength in the lengthwise and crosswise directions. The cross-lapping technique finds particular application in the formation of laminates composed of unidirectionally oriented polymers. It is well known that many polymers, e.g., polyolefins, when highly oriented unidirectionally exhibit high tensile strength in the direction of orientation and low tensile strength in a direction transverse the orientation. Consequently, in order to improve the tear strength of the material, processes have been developed to cross-laminate the polymeric sheets in such a way that the direction of orientation of adjacent layers is angularly disposed.

The purpose of the present invention is to provide an improved cross-lapping apparatus. More specifically, the invention contemplates the use of two separate film-dispensing means movable in intersecting and angularly disposed paths across a web-receiving platform. In each pass across the platform of either film-dispensing means, a web is deposited on the platform in superimposed and angularly disposed relation over the web deposited thereon by the immediately preceding pass. Thus as the operation of the film-dispensing means is alternated, a multilayered, cross-lapped stack is obtained. The overall thickness of the stack is controlled by limiting the number of film-dispensing passes.

While the preferred embodiment of this invention is described using films of polyolefin, it should be understood that other film or web materials can be used. A variety of types of films and combinations thereof can be used to obtain a final product designed for a specific end use. The individual layers may be bonded together by the addition of an adhesive or by a subsequent heat and pressure treatment.

In summary then, an object of the present invention is to provide an apparatus for cross-laminating sheet materials issuing from separate supply sources; another object is to provide an apparatus for cross-laminating sheets of unidirectionally oriented polymeric material; and a further object is to provide an apparatus for cross-laminating sheets of unidirectionally oriented polymeric material in such a way that the direction of orientation of adjacent sheets is angularly disposed.

Figure 2:
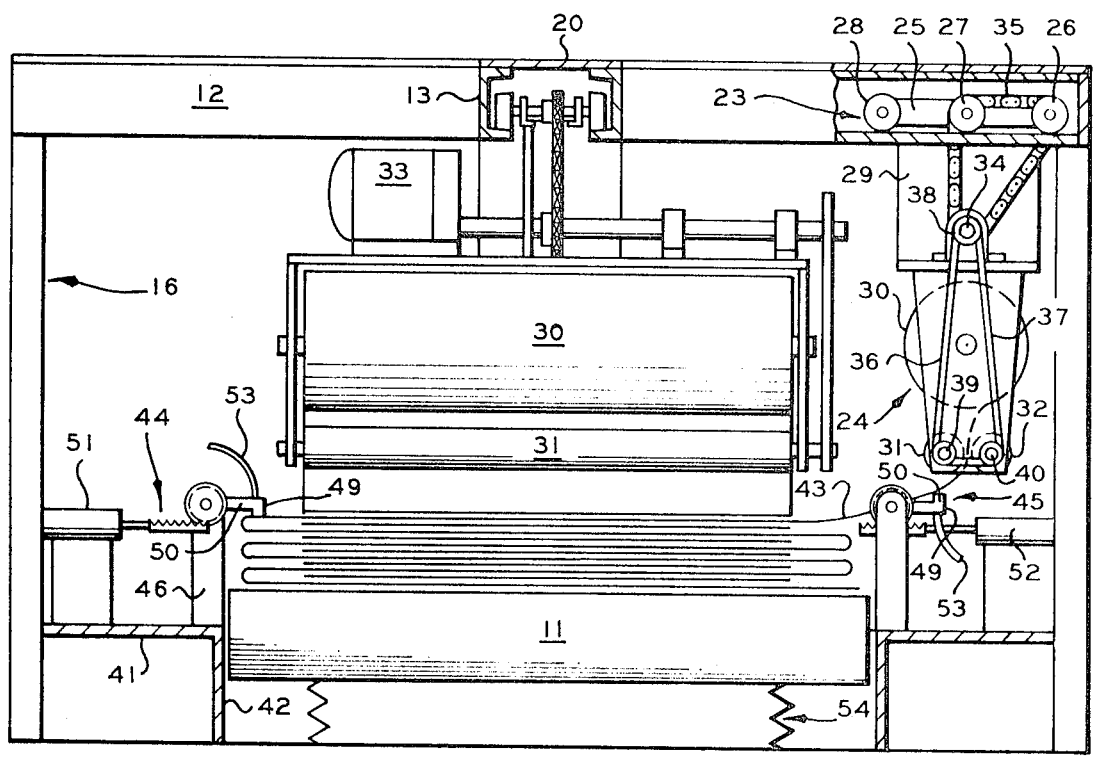

These and other objects will become apparent to those skilled in the art from the following disclosure taken in connection with the attached drawings in which:

FIG. 1 is a plan view of the cross-lapping apparatus constructed according to this invention, with portions cut away for convenience of illustration; and FIG. 2 is a sectional view of the apparatus shown in FIG. 1, the cutting plane taken generally along the line 2—2 thereof.

With reference to the drawings, a cross-lapping apparatus 10 constructed according to this invention is seen to include a horizontal platform 11, a pair of rectangularly disposed conveyor tracks 12 and 13, and film-dispensing assemblies 14 and 15 rollingly mounted in tracks 12 and 13, respectively. A substructure, shown generally as 16 supports the tracks 12 and 13 vertically spaced above the four-sided platform 11 wherein the tracks 12 and 13 intersect at right angles at a point above the geometric center of the platform 11. The tracks 12 and 13 are identical in construction, each including track halves having inner ends disposed at the point of intersection and outer ends disposed beyond the outer boundary of the platform 11. As best seen in FIG. 1, the inner ends of the track halves are welded together, the assembly defining a cross. Since the track halves are identical in structure, only one will be described in detail with like reference characters being assigned to corresponding parts of the other track halves.

As shown in FIG. 1, track half for track 13 comprises a pair of parallel and inwardly opening channels 17 and 18 joined at their outer ends by plate 19 and across their top by plate 20. Lower legs 21 and 22 of channels 17 and 18, respectively, are arranged in coplanar relation and provide support for a carriage assembly shown generally as 23. The carriage assembly 23 supports a film-dispensing means shown generally as 24 and power means for driving the assembly 24 across its associated track 13 and for dispensing the film in timed relation to the movement of the assembly 23. The carriage assembly 23 comprises a slotted channel 25 to which are journaled three in-line roller assemblies 26, 27 and 28. The spacing of the roller assemblies 26, 27 and 28 is such that the rollers of two of the assemblies will always be engaged with their respective channel supports 17 and 18 when the carriage assembly 23 passes the center opening separating the track halves. As shown in FIG. 2, a frame 29 depends from the channel 25 and provides support for the film-dispensing means 24 and its associated drive means.

The frame 29 journally supports a supply roll 30 of film material and a pair of nip rollers 31 and 32 disposed below the supply roll 30. The drive means comprises a gear motor 33 with forward and reverse drives for driving shaft 34, a chain drive 35 interconnecting driven shaft 34 and roller assemblies 26 and 27, and a V-belt drive 36 interconnecting driven shaft 34 and the shafts of nip rollers 31 and 32. The V-belt drive 36 includes a V-belt 37 trained around a pulley 38, mounted on shaft 34, and pulleys 39 and 40, respectively, mounted on the shafts of nip rollers 31 and 32. Pulleys 39 and 40 are conventional one-way drive pulleys provided with integral one-way clutches so that in counterclockwise movement of V-belt 37, nip roller 32 is the driven member and nip roller 31 is the freewheeling member. In clockwise orbital movement of V-belt 37 the reverse is true; that is, nip roller 31 is the driven member and nip roller 32 is the freewheeling member.

The substructure 16 includes a stationary platform 41 having a square opening 42 formed therein. The areal dimensions of the opening 42 provide a close tolerance for platform 11 movably mounted therein. A plurality of compression springs 54, two of which are shown in FIG. 2, impose an upward bias force on the movable platform 11. Thus, the film-receiving platform 11 is maintained at the same elevation for each film layer deposited thereon.

Film 43 issuing from the supply roll 30 is threaded through the nip rollers 31 and 32. Thus it will be appreciated that as the carriage assembly 23 is driven to traverse the limits of its associated track, film is simultaneously dispensed through the operation of rollers 31 and 32 which is in timed relation to the movement of carriage assembly 23. Thus, as the assembly 23 is driven across the underlying film-receiving platform 11, a sheet of filmed material 43 is guidingly deposited thereon. In order to restrain the ends of each layer, each film-dispensing means 14 and 15 has associated therewith a pair of holddown assemblies shown generally as 44 and 45 in FIG. 2. The holddown assemblies 44 and 45 are disposed on opposite sides of the platform 11 and alternately operate to restrain an edge portion of the film 43 as the assembly 23 moves in the opposite direction. Each assembly includes a pair of spaced-apart brackets 46 which journally support a shaft 47 (see FIG. 1). A pair of arms 48, 48 secured to the shaft 47 carries at its outer ends a film-gripping bar 49. Film-gripping bar 49 is elongate extending substantially the entire width of the film 43. The elongate bar 49 is provided with an internal cavity, an inlet 50 to the cavity, and vacuum line 53 for evacuating the cavity so that when the passage 50 is covered by the film 23, the film becomes vacuum locked to the bar 49. The holddown assemblies 44 and 45 are moved between an operative position and an inoperative position by means of hydraulically actuated rack and pinion assemblies shown generally as 51 and 52, respectively. Thus, when the cylinder piston rod is extended the rack rotates a pinion moving the bar 49 from the operative to the inoperative position. Retraction of the piston rod causes the bar 49 to pivot to the operative film-restraining position.

Summarizing the structure then, the film cross-lapping machine comprises first and second film-dispensing assemblies 14 and 15 movable in their respective tracks 12 and 13 in intersecting and perpendicularly disposed paths. The respective film-dispensing assemblies include drive means for feeding film onto the film-receiving platform 11 in timed relation to their rectilinear movement across their respective track. The film holddown means restrain the film at the side of the platform 11 from which the film-dispensing means moves so that the film is deposited on the platform 11 in a layer. Now, by alternately operating the film-dispensing assemblies 14, 15 and their associated holddown means, the film of the first assembly can be interlaced with the film of the second assembly. If desired, the operation can be programmed, by means not shown, so that film-dispensing assembly 14 makes two passes for each pass of film-dispensing assembly 15. Other variations of passes are possible. It should be noted that the stackup of layers can be made with or without an adhesive. An adhesive applicator can be mounted in the area of the nip rollers 31 and 32 so that the film 23 contains wet adhesive when deposited on the platform 11.

In operation let it be assumed that supply roll 30 comprising unidirectionally oriented film 23 is mounted on frame structure 29 in each of the assemblies 14 and 15. The film 43 of each of the supply rolls 30 is threaded through their respective pairs of nip rollers 31 and 32 and their ends are anchored to the film-receiving platform 11 by means of their respective holddown assemblies.

Initially, the first film-dispensing assembly 14 is driven across its associated track 12 from left to right with holddown assembly 44 in the operative position laying the film material dispensed therefrom on platform 11 which is in the uppermost position as viewed in FIG. 2. Now as the assembly 14 reaches the limit of its dispensing stroke, a portion of the film 43 immediately below the pair of rollers 31 and 32 blocks passage 50 causing the film 43 to be vacuum locked to bar 49 of holddown assembly 45, which is in the inoperative position. Next the second film-dispensing assembly 15 is driven through its dispensing stroke from bottom to top as viewed in FIG. 1 laying the film in superimposed relation on film laid down by assembly 14. When the stroke of either film-dispensing assembly 14 or 15 is reversed, the holddown assembly shown in the inoperative position as viewed in FIG. 2 is moved to the holding position. The film-dispensing assemblies 14 and 15 make alternate strokes until the cross-laminated stack is completed.

The laminated stack formed by the apparatus of this invention comprises a plurality of unidirectionally oriented layers, the direction of orientation being angularly disposed with respect to vertically adjacent layers. The laminated stack can further be processed by a heat press to bond the layers together. It should be observed that the apparatus of this invention can also be used to form a composite laminate. For example, the roll 30 mounted on the assembly 15 can be polyglass while the roll mounted on the assembly 14 can be plastic. Summarizing, then, the apparatus according to this invention can be used to form laminates having unidirectionally oriented layers disposed perpendicularly to adjacent layers or laminates having alternate layers of different materials.

Variations and modifications in the apparatus described above can be made without departing from the scope and spirit of this invention as set forth in the appended claims.

What is claimed is:

1. An apparatus for cross-laminating a pair of films, said apparatus comprising:

a vertically movable platform;

a first film-dispensing means disposed over said platform and including means for carrying a first film supply roll, means for issuing a first film from said first supply roll, a film guide disposed between said supply roll and said platform for guiding said film issuing from said first supply roll onto said platform, and means for moving said first film-dispensing means in back-and-forth strokes across said platform so that a layer of said first film is deposited thereon for each stroke, said layers being accumulated in superimposed relation on said platform;

a second film-dispensing means disposed over said platform and including means for carrying a second film supply roll, means for issuing a second film from said second film supply roll, a film guide disposed between said second supply roll and said platform for guiding film issuing from said second supply roll onto said platform, and means for moving said second film-dispensing means in a back-and-forth stroke across said platform so that a layer of said second film is deposited thereon for each stroke, said layers being accumulated in superimposed relation, the path of movement of said first and second film-dispensing means being perpendicular and in intersecting relation so that the layers of said first film are cross-laminated with the layers of said second film;

a biasing spring attached to the platform urging said platform upwardly toward the first and second film-dispensing means;

said spring having a coefficient of elasticity such that the platform is lowered with each film layer deposited thereon so that the topmost film layer is maintained at a substantially constant elevation;

a first film-gripping bar extending across at least a portion of the width of the film dispensing from the first film-dispensing means positioned adjacent the platform on a side of the platform opposed to the second film-dispensing means and being pivotally movable relative to the platform and film deposited on the platform between an operative position at which said first bar is in contact with the film deposited on the platform and maintaining an upper surface of said film at a preselected elevation and an inoperative position at which said bar is laterally spaced from the film deposited on the platform;

a second film-gripping bar extending across at least a portion of the width of the film dispensing from the second film-dispensing means positioned adjacent the platform on a side of the platform opposed to the second film-dispensing means and being pivotally movable relative to the platform and film deposited on the platform between an operative position at which said second bar is in contact with the film deposited on the platform and maintaining an upper surface of said film at a preselected elevation and an inoperative position at which said bar is laterally spaced from the film deposited on the platform; and first and second separate actuating means each associated with a respective first and second film-gripping bar for synchronously pivoting the bars to the operative and inoperative positions in response to movement of the first and second film-dispensing means, each actuating means moving its gripping bar to the operative position as its associated dispensing means reaches the end of its stroke toward said gripping bar and each actuating means moving its gripping bar to the inoperative position during movement of its associated dispensing means extension stroke toward said gripping bar for maintaining the film relative to the platform and maintaining the upper surface of the film on the platform at a preselected elevation.

2. The invention as recited in claim 1 wherein said first and second film-dispensing means include first and second tracks, respectively, said tracks substantially spanning said platform and arranged in perpendicular relation, said tracks intersecting at the geometric center of said platform, and first and second carriage assemblies movably mounted in said first and second tracks respectively, said guide means for each of said first and second film-dispensing means including a pair of nip rollers disposed on opposite sides of said film issuing from said respective supply roll, one of said nip rollers being operative to dispense film from said supply in response to movement of its respective film-dispensing means in one direction, and the other of said nip rollers being operative to dispense film from said respective supply roll in response to reverse movement of said respective film-dispensing means.

3. An apparatus, as set forth in claim 1, wherein the film-gripping bar is a vacuum tube having means for vacuum locking said film-gripping bar to the film in the operative position of the tube.

4. An apparatus, as set forth in claim 1, wherein the first and second separate actuating means each comprises a cylinder and associated rack and pinion gears with said pinion gears actuated by the cylinder through the rack.